E. A. ERIKSSON.
CARRIAGE OR SADDLE GUIDE FOR LATHES.
APPLICATION FILED JUNE 7, 1918.
1,315,917.
Patented Sept. 9, 1919.
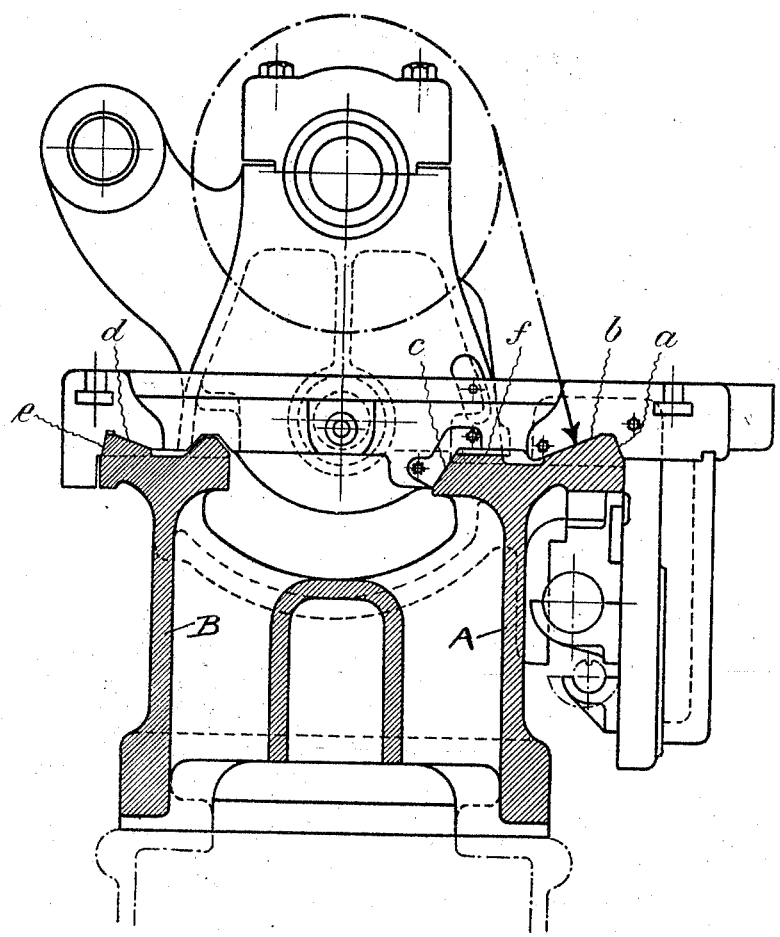
Inventor
E. A. Eriksson
Atty.

UNITED STATES PATENT OFFICE.

ERIK ALBERT ERIKSSON, OF STOCKHOLM, SWEDEN.

CARRIAGE OR SADDLE GUIDE FOR LATHES.

1,315,917.     Specification of Letters Patent.     Patented Sept. 9, 1919.

Application filed June 7, 1918. Serial No. 238,756.

*To all whom it may concern:*

Be it known that I, ERIK ALBERT ERIKSSON, a citizen of Sweden, residing at Stockholm, Sweden, have invented certain new and useful Improvements in Carriage or Saddle Guides for Lathes, of which the following is a full, clear, and exact description.

This invention relates to a carriage or saddle guide for lathes and especially lathes used for cutting coarse threads and the like. Lathes employed for this work are usually provided with front and rear V-shape ways, but it has been demonstrated that this construction is objectionable in the production of certain kinds of work. The saddle guide is one of the most important parts of a lathe, and it must therefore be so constructed that it will meet the greatest essential requirements, when the lathe is in operation. Several attempts have been made to improve the saddle guides of lathes, but such constructions known to me are defective in one particular or another. A practical saddle guide must function properly under all circumstances, and it is one of the objects of the present invention to provide a saddle having the essential characteristics to meet these practical conditions.

The figure illustrated in the drawing represents conventionally a cross section of a lathe, the saddle being shown in full and the upper portion in dotted lines. A indicates the front way, and B, the rear way of my improved saddle guide.

The way A, is provided with a front beveled guiding surface $a$, a rear beveled guiding surface $c$, and an intermediate upper beveled guiding surface $b$, the latter being adjacent the beveled guiding surface $a$. The way B, is provided with a rear beveled guiding surface $e$, and an adjacent upper beveled guiding surface $d$, which inclines downwardly and toward the center of the lathe. The two outside guiding surfaces, $a$ and $e$, incline at a comparatively small angle, less than 30°, to a vertical plane whereby to counteract the tendency of the carriage to slip back or climb up on the saddle. These guiding surfaces are intended to take up the torsional strain and the perpendicular pressure when the lathe is operated. The guiding surface $c$, which is at a comparatively small angle with reference to a vertical plane, is located at a comparatively great distance from the upper beveled guiding surface $b$, and as near as possible to the center of the lathe, in order to support the central part of the carriage, and it is disposed on the inside of a horizontal guiding surface $f$ to accommodate the loose head stock or puppet head in relation to the guiding surfaces $a$ and $b$.

The guiding surface $c$, is intended to take up the pressure in a direction opposite the pressure taken up by the guiding surface $a$, and it also serves as an intermediate supporting guide when turning small diameters. The guiding surfaces $b$ and $d$, of the ways form the main guides and are arranged immediately inside of the guiding surfaces $a$ and $e$, and form a comparatively small angle, less than 30°, to a horizontal plane. These surfaces $b$ and $d$ take up the pressure from above, the broader surface $b$, taking up the greatest tool pressure when turning large diameters, as shown by the arrows.

Lathes known to me are generally provided with saddles having guides of an inverted symmetrical V, *i. e.*, with both faces forming an equal angle to a horizontal plane, and lathes are also known to me in which the outer one of these two surfaces is broader than the inner one and forms a small angle to a horizontal plane, in order to take up the tool pressure when pieces of large diameter are turned. This is, however, a wrong theory for the whole saddle or carriage tends to be lifted on account of the vibration arising when large diameters are turned.

This difficulty is completely avoided in the present invention, and I have found that by arranging the two slightly inclined surfaces $b$ and $d$ as shown, the vertical pressure inside of the outer surfaces $a$ and $e$ is taken up, while by providing a separate guiding surface $c$, as an intermediate supporting guide, a construction is provided which partly takes up the pressure, when smaller work pieces are turned and which partly take up the pressure in a direction opposite to the pressure on the surface $a$.

Having thus described my invention, what I claim is:—

A saddle guide for a lathe comprising front and rear ways, each of which is provided with two beveled surfaces forming an inverted V, the inside beveled surfaces being formed at an angle less than 30° with a horizontal plane, to form main guides, and the two outside beveled surfaces being formed at an angle less than 30° with a vertical plane, whereby to counteract the tendency of the carriage of a lathe to slip back and to prevent it from climbing up, the rear edge of the front way being beveled at an angle to a vertical plane, and disposed inside of the inner beveled surface on said front way near the center line of the lathe, whereby to form a support for the central portion of the upper part of a lathe.

In testimony whereof, I have signed my name to this specification in the presence of two subscribing witnesses.

ERIK ALBERT ERIKSSON.

Witnesses:
KARL AHLBERG,
I. W. JOHANSSON.

Copies of this patent may be obtained for five cents each, by addressing the "Commissioner of Patents, Washington, D. C."